United States Patent [19]

Venuti

[11] 4,363,217

[45] Dec. 14, 1982

[54] VIBRATION DAMPING APPARATUS

[76] Inventor: Guy S. Venuti, 56 Putnam St., Watertown, Mass. 02172

[21] Appl. No.: 229,735

[22] Filed: Jan. 29, 1981

[51] Int. Cl.³ .............................................. B01D 8/00
[52] U.S. Cl. ...................................... 62/55.5; 55/269; 62/268; 62/295; 248/636; 248/638
[58] Field of Search ................ 62/55.5, 100, 268, 295, 62/296; 417/901; 55/269; 248/636, 638

[56] References Cited

U.S. PATENT DOCUMENTS

| | | | |
|---|---|---|---|
| 3,609,992 | 10/1971 | Cacheux | 62/514 R |
| 3,742,729 | 7/1973 | Zulliger | 62/514 R |
| 3,894,403 | 7/1975 | Longsworth | 62/514 R |

OTHER PUBLICATIONS

Technical Manual for Displex Closed-Cycle Refrigeration System, Air Products and Chemicals, Inc., 1978.

Primary Examiner—Ronald C. Capossela
Attorney, Agent, or Firm—Schiller & Pandiscio

[57] ABSTRACT

A cryogenic vacuum pump has an expander module suspended from the vacuum chamber of an electron microscope by a metal bellows which dampens the vibrations transmitted to the electron microscope from the expander module. A weight mounted on the expander module and disposed around the bellows counters the lifting force of the atmospheric pressure acting on the expander module and protects the bellows. The expander module is maintained in a centered position by vibration damping isolators disposed symmetrically around the expander module and which are attached to a support extending down from the vacuum housing. In one embodiment the isolators are bar magnets which repel magnetic ring attached to the expander module. In another embodiment the isolators are ladders in which the rungs are wire cables tensioned between a side members attached respectively to the expander module and to the support. The compressor of the cryogenic vacuum pump is a separate unit having a high pressure feed line and a low pressure return line which are connected to the inlet and outlet of the expander module by helical flexible hoses having freely suspended turns which damp the vibrations transmitted by the hoses.

10 Claims, 4 Drawing Figures

VIBRATION DAMPING APPARATUS

This invention relates in general to damping of vibrations and more particularly pertains to an arrangement for mounting a cryogenic vacuum pump to vibration sensitive apparatus in manner such that transmission of vibrations to the sensitive apparatus from the pump is minimized. Although the invention is generally applicable to situations in which a cryogenic vacuum pump is attached to sensitive apparatus by vibration damping means, for ease of exposition the invention is here described in relation to its employment in the attachment of a cryogenic vacuum pump to an electron microscope.

Three general types of vacuum pumps have been used to provide the vacuum required by electron microscopes, viz., the oil diffusion pump, the ion pump, and the turbomolecular pump. Of those three pump types, the oil diffusion pump is the type most used with electron microscopes manufactured within the last few years. Despite improvements in oil diffusion pumps, contamination of the electron microscope by oil vapor is still a major problem with that type of pump. The contamination problem has become more acute in those electron microscopes in which higher vacuums are now employed than were used in earlier electron microscopes. Cooling of the specimen chamber of the electron microscope has been employed to suppress contamination deposited on the specimen by the interaction of the electron beam with traces of hydrocarbon vapor. Experience has shown that in the absence of special precautions, contamination can build up rapidly and obscure the fine detail of the speciman at high magnification.

The ion pump operates by generating electrons which are spiraled into a long path. When those electrons collide with gas molecules, a positive charge is imparted to the gas molecules; such ionized gas molecules are then attracted to and collected on a negatively charged electrode. The disadvantages of the ion pump are its large size, its high cost, its low pumping speed and its generation of magnetic fields that may disturb the beam of the electron microscope. Turbomolecular pumps have been employed in attempts to solve the problems of the ion pump. However, turbomolecular pumps have the disadvantage of even slower pumping speed. Moreover, foreign matter drawn or dropped into a turbomolecular pump will destroy it.

The problems associated with the oil diffusion pump, the ion pump and the turbomolecular pump can be avoided by employing a cryogenic pump. Cryogenic pumping is accomplished by condensing gases on surfaces that are at extremely low temperatures. Modern cryogenic pumps operate on a closed cycle which produces extremely low temperatures, thus eliminating the need for costly liquid nitrogen and requires far less energy than a diffusion pump operating at the equivalent pumping speed. In short, the modern cryogenic pump is an efficient device for producing a contamination-free vacuum and has the additional merit of high pumping speed.

Electron microscopes are sensitive to vibration. U.S. Pat. No. 3,814,356 sets forth some of the considerations for isolating an electron microscope from vibration from external sources. In attaching a cryogenic pump, or any other type of pump, to an electron microscope, it may be necessary (and it is in any event highly desirable) to provide a vibration-damping mount that minimizes, as much as possible, the transmission of vibrations from the pump to the electron microscope.

Accordingly, the principal object of the present invention is to provide an arrangement for coupling a cryogenic pump to vibration-sensitive apparatus in a manner that minimizes transmission of vibrations to the sensitive apparatus.

To accomplish the foregoing and other objects of the present invention, there is provided a vibration damping system for substantially eliminating vibrations from a cryogenic vacuum pump system used with a vacuum chamber, typically of an electron microscope or electron microprobe. The vibration damping in accordance with the invention employs an elastic metal bellows and a plurality of isolators interrelated in the following manner. The metal bellows support at least the expander module of the pump in a position below the vacuum chamber and is intended to provide vacuum communication between the chamber and module. The weight of the equipment suspended by the bellows places the latter in tension, and thus tends to stabilize vibrations of the module along the vertical axis of the bellows. In the preferred embodiment, three ladder isolators are used to stabilize the module for lateral vibrations i.e. those transverse to the bellows axis. Each such isolator preferably comprises a plurality of wirewrapped stainless steel wires. The isolators are disposed symmetrically about the expander module and connect to a fixed external housing.

Other objects of the invention will in part be obvious and will in part appear hereinafter. The invention accordingly comprises the apparatus possessing the construction, combination of elements and arrangement of parts, all of which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 1:
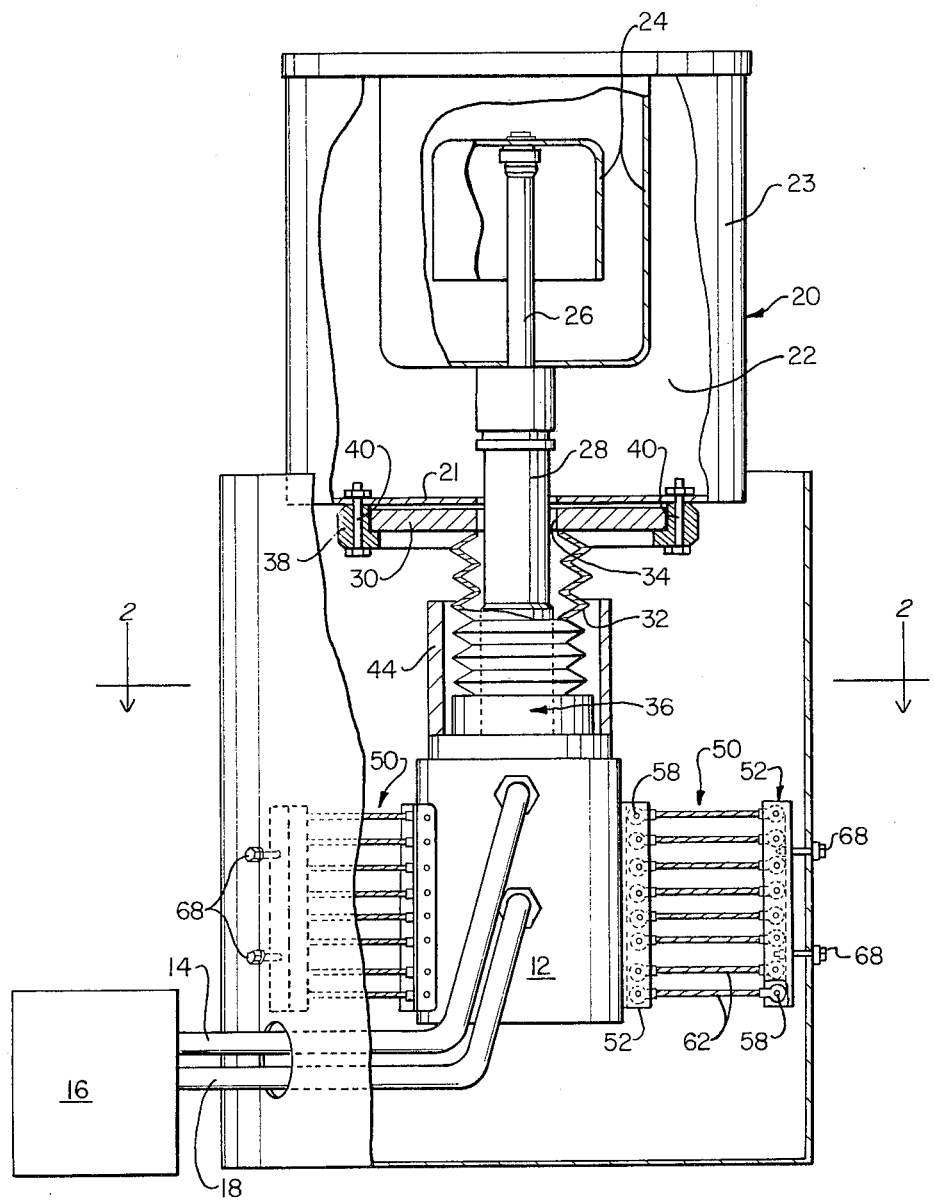
FIG. 1 is an elevational view with parts broken away, showing an embodiment of the invention employing ladder isolators.

Referring now to FIG. 1, the electron microscope is shown only in fragment represented by cylindrical housing 20 forming vacuum chamber 22 in which a high vacuum is produced by a cryogenic pump, housing 20 being mounted on support means 10. A pump of that type is made by Air Products and Chemicals, Inc., of Allentown, Pa. and is sold as part of that company's CSA-202 Cryogenic Refrigeration System. As is well known in the art, such a cryogenic pump employs a closed cycle involving the compression of gaseous helium, the removal of the heat of compression by water cooling, and the expansion of the cooled gas to produce refrigeration. In that system, the compressor 16 of the cryogenic pump is a separate unit located remotely from expander module 12; the latter has two expansion stages 26 and 28. The compressor serves as the source of cooled, gaseous helium which is furnished at high pressure through feed line 14 to the expander module which operates in the Solvay cycle. The helium is returned to the compressor through low pressure return line 18. Expander module 12 encases an electric motor (not shown), termed the "valve motor", which is necessary to the operation of the expander module. The operation of the expander module is more fully described in the Technical Manual published by Air Products and Chemicals, Inc., for the Displex Closed-Cycle Refrigeration System for the Model CSA-202 system and that Technical Mnaual is herein incorporated by reference.

In the structure of the invention, means are provided in the form of a tubular, hollow, elastically extensible and contractable bellows 32 formed of a gas impervious material, for suspending the expander module from cylindrical housing 20. Preferably, the bellows is a stainless steel, welded-diaphragm bellows of the type made by the Metal Bellows Corporation at Sharon, Mass.; this type of bellows is more fully described in Catalog No. 347-77 of that company. Expander module 12 is provided with metal collar 36 to which the lower end the metal bellows is intended to form a hermetically sealed union. At its upper end, metal bellows 32 can be welded to the bottom wall 21 of housing 20 so that the interior of the bellows communicates with aperture 34 in the bottom of housing 20. The upper welded connection provides a joint that is especially useful when an ultra-high vacuum is to be produced in chamber 22 of the device shown in FIG. 1. The upper welded connection may be however, an impediment to servicing of the microscope and the vacuum system. Therefore, it may be preferable to employ a type of connection which provides the high or ultra-high vacuum seal while permitting disassembly of the connection when circumstances require. Where that type of connection is desired, as shown in FIG. 1, the upper end of the bellows is welded as shown to rigid flange 38 and the latter is coupled by bolts 40 to bottom wall 21 of housing 20 so as to compress soft copper gasket 30 to provide an ultra-high vacuum seal, a type of connection well known in vacuum technology. Where high and ultra-high vacuums are employed in electron microscopes, it is prudent to avoid using O-ring seals because grease or oil on such seals tends to contaminate the microscope.

When suspended by the bellows, the two expansion stages of the expander module preferably protrude into vacuum chamber 22 through central opening 34 in the bottom wall of housing 20. As a vacuum is produced in chamber 22, the entire expander module is subjected to a lifting force by the atmospheric pressure acting on the module. The magnitude of that lifting force is related to the interior diameter of the bellows. While the weight of the expander module may be sufficient to minimize the effect of the lifting forces, additional weighting means 44 may be provided to aid in opposing the lifting force. As shown, preferably such added weighting means is disposed to surround the bellows to protect the latter from damage. The weighting means can be two semicircular segments bolted or otherwise held together to form a cylinder encircling the bellows. Placing the added weight around the bellows rather than at the bottom of the expander module has the additional advantage that it does not increase the length of the column of apparatus attached to the microscope's vacuum chamber.

In operation, upward or downward movement or vibration (i.e. vertical along the bellows axis) of the expander module tends to be damped or absorbed by bellows so as to be materially attenuated before reaching housing 20. In one embodiment of the invention, the bellows has an inner diameter of 2", an outer diameter of 3" and a length of about 3". In general, the longer the bellows, the better the damping action. However, long lengths of stainless steel, welded diaphragm, metal bellows are expensive, and cost should be balanced against the incrementally better damping obtained from a longer bellows.

Secured to expansion stages 28 and 26 are two cylindrical cryopanels 23 and 24. The latter provide large cold surfaces on which the gases in chamber 22 are intended to condense. Cryopanel 23 has its cylindrical wall parallel to but spaced from the cylindrical wall of housing 20 by a clearance space. If the expander module, which is suspended on the bellows, moves or vibrates laterally or tilts, cryopanel 23 may contact housing 20 and provide a thermal path which can cause the adsorbed condensed gases to be desorbed from the cryopanel. Further, contact of the cryopanel with the housing provides a path for transmission of vibrations to the microscope. Consequently, it is very desirable to stabilize the expander module to keep it centered and to prevent its tilting, while minimizing the transmission of vibrations from the module to the electron microscope. The weight of the expander module and of its attachments is preferably distributed symmetrically so that the center of gravity of the mass is directly in line with the center of aperture 34 in bottom wall 21 of the vacuum chamber housing.

Figure 2:
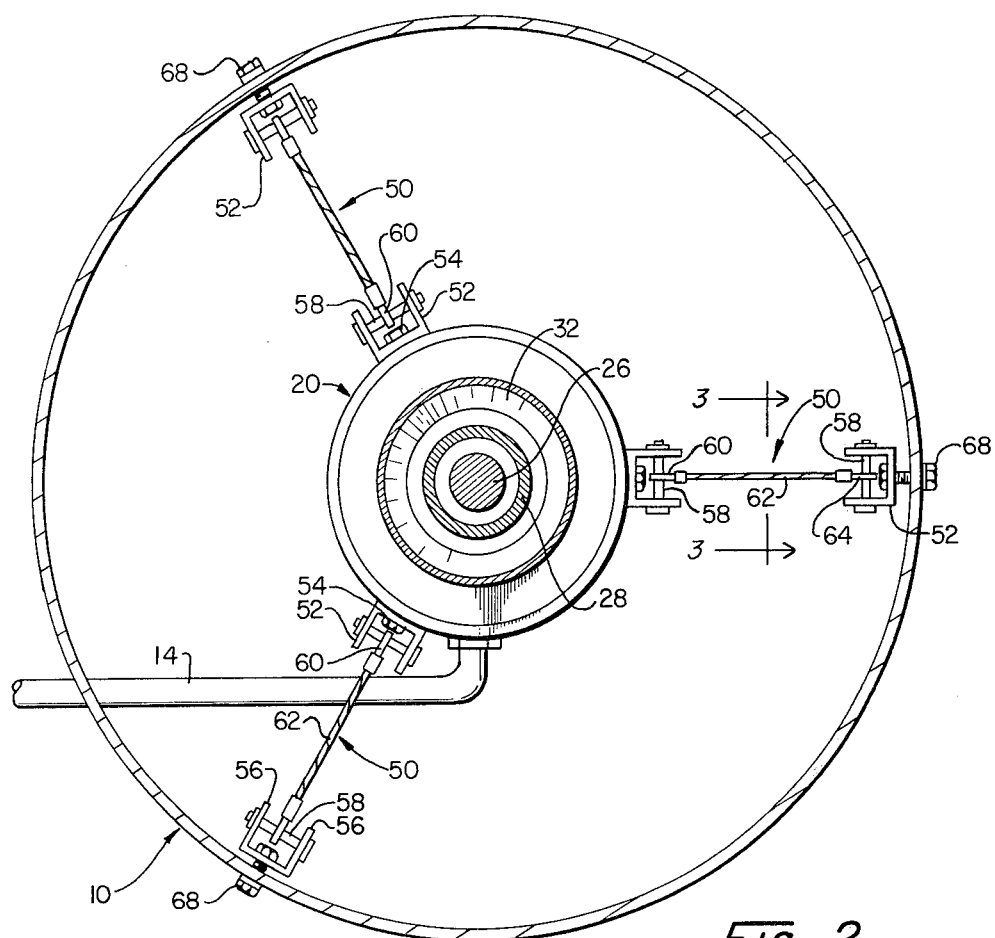
FIG. 2 is a cross-sectional view taken along the parting plane 2—2 in FIG. 1 to show the symmetric disposition of the isolators.
Figure 3:
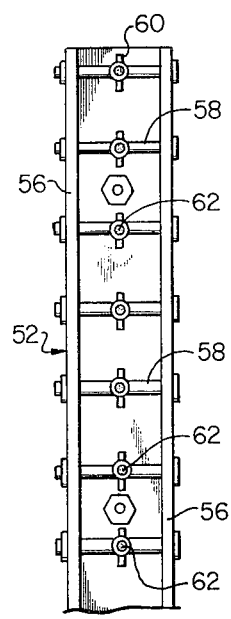
FIG. 3 is a view taken along the parting plane 3—3 in FIG. 2 showing details of the ladder isolators.

The expander module is stabilized, as shown in FIGS. 1, 2, and 3, by a plurality of at least three vibration damping isolators, preferably ladder isolators 50, disposed symmetrically around the module. Accordingly, the three ladder isolators are situated at 120° intervals about the periphery of module 12, as depicted in FIG. 2, and hold the expander module in its centered position while cooperating with the bellows to prevent the module from tilting. Inasmuch as the ladder isolators are identical, only one of the ladder isolators is here described.

Each ladder isolator comprises a pair of sides formed of elongated U-channel members 52. One of those members is couplable to the expander module typically by welding or by bolts. The other of those U-channel members is couplable, typically by bolts 68 to support member 10 that is secured to and extends down from the vacuum chamber of the electron microscope. Connecting the two U-channel members are a plurality of substantially parallel stainless steel stranded wire cables 62 of the type described in military specification MIL-W-83420. Each wire cable 62 at its ends is provided with eyelets 60. Pins 58 anchored in the U-channels pass through the eyelets of the wire cables and hold the cables between the two U-channel members. By tightening bolts 68, cables 62 may be placed in tension. The cables are made of strands of stainless steel which are spirally wrapped so that damping of vibrations is provided by rubbing and sliding friction between the strands. In one embodiment of the invention as shown, the ladder isolator has eight cables, each of about 3" in length and about 1/16" in diameter. It is preferred to use as little tension as possible on the cables consistent with holding the expander module centered under operating conditions. It has been found by experience that vibrations tend to be transmitted by the cable when the cable tension is increased to too large an extent.

Instead of using separate cables in the ladder isolator, the problem of having the separate cables of precisely the same length is avoided by using a single length of cable passed back and forth between the two support members and anchored at the cable ends. The cable thus passes freely through holes in the support members and is able to slip intermediate its ends relative to the support members. When a strain is put upon the cable, the latter tends to self-adjusting so that each run of cable between the two members carries its share of the load.

Figure 4:
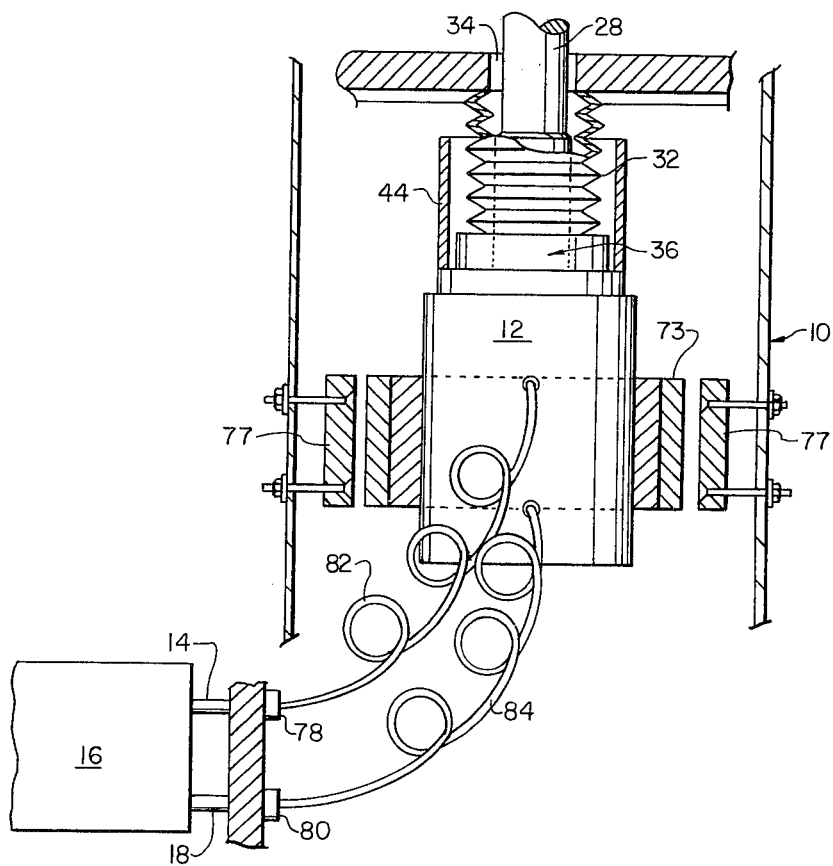
FIG. 4 is an elevational view with parts broken away to show an embodiment of the invention employing magnetic isolators.

In lieu of using ladder isolators, the arrangement depicted in FIG. 4 can be employed. In that arrangement, magnetic isolators are employed to stabilize the expander module. Magnetic ring 73 is attached to the expander module. The external face of the ring is of one magnetic polarity, while the inner face is of the opposite magnetic polarity. Attached to support 10 extending down from the electron microscope, are three bar magnets 77 spaced at 120° intervals around the ring. The poles of the bar magnets facing the ring are of the same magnetic polarity as the external face of the ring so that the ring is repelled by the magnetic fields of the bar magnets. Inasmuch as the bar magnets are equidistant from the ring, the repulsion forces acting on the ring tend to elastically maintain the expander module in its centered position.

The bar magnets are elongated in the vertical direction. Consequently up and down movement of the expander module does not affect the centering action of the magnetic isolators.

Where the magnetic fields of the ring or of the bar magnets are found to interfere with the electron beam, a magnetic shield can be employed to confine the stray magnetic fields. In general, however, the expander module is usually at the lowest part of the column so that the magnetic fields of the ring and bar magnets should not materially affect the electron beam.

As stated earlier, the compressor furnishes cooled gaseous helium at high pressure through feed line 14 to expander module 12; the helium, after expansion, is returned through low pressure return line 18 to compressor 16. It has been found that the feed and return lines tend also to transmit vibrations from the compressor to the expander module. To damp out those vibrations, as shown particularly in FIG. 4, in one embodiment, couplings 78 and 80 of feed line 14 and return line 18 are respectively preferably anchored externally. Flexible hoses 82 and 84, formed of a material, such as nylon, substantially impervious to gaseous helium is interposed between those couplings and the inlet and outlet connections of the expander module. To better damp the vibrations, each of the flexible hoses are formed as helices and are freely suspended to absorb vibrations. Preferably when each hose is of nylon, the helix has six or seven turns.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In apparatus for connecting the expander module of a cryogenic vacuum pump assembly to an opening in the bottom of the housing of a vacuum chamber, and including support means disposed about said pump, the improvement comprising, in combination:

a tubular, elastic bellows formed with opposite open ends;

means for vacuum-sealing one of said ends to said opening to communicate therewith;

means for vacuum-sealing the other of said ends to and in communication with said expander module so that said module is suspended by said bellows below and spaced from said housing; and a plurality of vibration isolators for coupling said module to said support means, said isolators being arranged symmetrically around said module for constraining vibratory movement of said module.

2. The improvement according to claim 1, including weighting means coupled to said other end of said bellows for countering lifting forces acting on said module as said chamber is evacuated.

3. The improvement according to claim 2 wherein said weighting means is a cylinder disposed about said bellows.

4. The improvement according to claim 1 wherein said bellows is a stainless steel, welded diaphragm type.

5. The improvement according to claim 1 wherein each of said isolators comprises a vertically elongated magnet and corresponding magnetic field means, each being respectively fixed to a corresponding one of said module and said support means so that the magnetic fields thereof repel one another.

6. The improvement according to claim 1 wherein each of said isolators comprises a two-sided ladder structure having one side couplable to said module and the other side couplable to said support means, the two sides of said ladder being connected to one another by a plurality of substantially parallel, spaced-apart, stranded wire cables.

7. The improvement according to claim 6 wherein said cables are held in tension when said sides of said ladder are coupled respectively to said support means and said module.

8. The improvement according to claim 6 wherein said plurality of isolators comprises at least three.

9. The improvement according to claim 1 wherein a portion of said module extends through the interior of said bellows into said vacuum chamber.

10. The improvement according to claim 1 wherein said apparatus includes gas feed and return lines for connecting said module to a compressor, said lines being formed, at least in the part thereof intended to connect to said module, of a flexible material, substantially impervious to said gas and being shaped as helices freely suspended from said module.

* * * * *